United States Patent [19]

Schaefer et al.

[11] 4,174,088

[45] Nov. 13, 1979

[54] VEHICLE SEAT

[75] Inventors: Peter Schaefer; Wolfgang Doerre, both of Gummersbach, Fed. Rep. of Germany

[73] Assignee: ITT Industries, Inc., New York, N.Y.

[21] Appl. No.: 843,191

[22] Filed: Oct. 18, 1977

[30] Foreign Application Priority Data

Oct. 20, 1976 [DE] Fed. Rep. of Germany ....... 2647288

[51] Int. Cl.² .................. F16M 13/00; B60N 1/02
[52] U.S. Cl. ..................................... 248/395; 248/420
[58] Field of Search ............... 248/393, 394, 395, 396, 248/419, 420, 397

[56] References Cited

U.S. PATENT DOCUMENTS

| 2,161,367 | 6/1939 | McGregor et al. | 248/394 |
|---|---|---|---|
| 2,202,113 | 5/1940 | Miller | 248/420 X |
| 2,261,728 | 11/1941 | Lawler | 248/395 |
| 2,730,162 | 1/1956 | Davis | 248/395 X |
| 3,167,297 | 1/1965 | Lohr | 248/419 |
| 3,240,464 | 3/1966 | Pickles | 248/419 |
| 3,269,687 | 8/1966 | Pickles | 248/397 |

FOREIGN PATENT DOCUMENTS

| 1923159 | 11/1970 | Fed. Rep. of Germany | 248/420 |
|---|---|---|---|
| 590968 | 8/1947 | United Kingdom | 248/419 |

*Primary Examiner*—Lawrence J. Staab
*Attorney, Agent, or Firm*—John T. O'Halloran; Alfred C. Hill

[57] ABSTRACT

There is disclosed an adjusting mechanism for a vehicle seat which is adjustable in guideways in the longitudinal direction and whose inclination is variable by another adjusting device. In this arrangement, the adjusting device for longitudinal adjustment is automatically coupled with the adjusting device for inclination adjustment. This coupling is achieved by a train of toothed gears having a shaft associated with the longitudinal adjustment and another shaft associated with the inclination adjustment.

3 Claims, 4 Drawing Figures

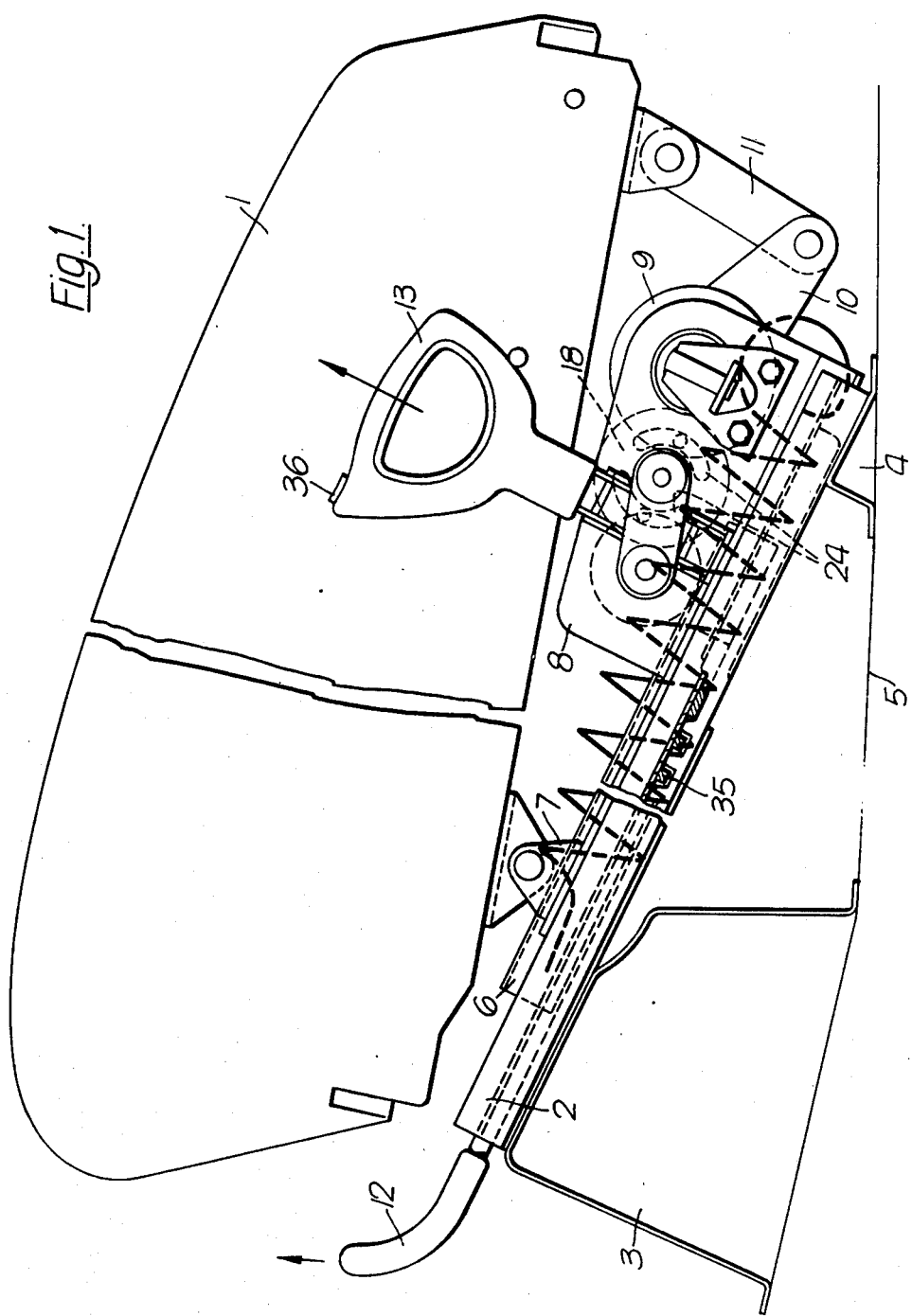

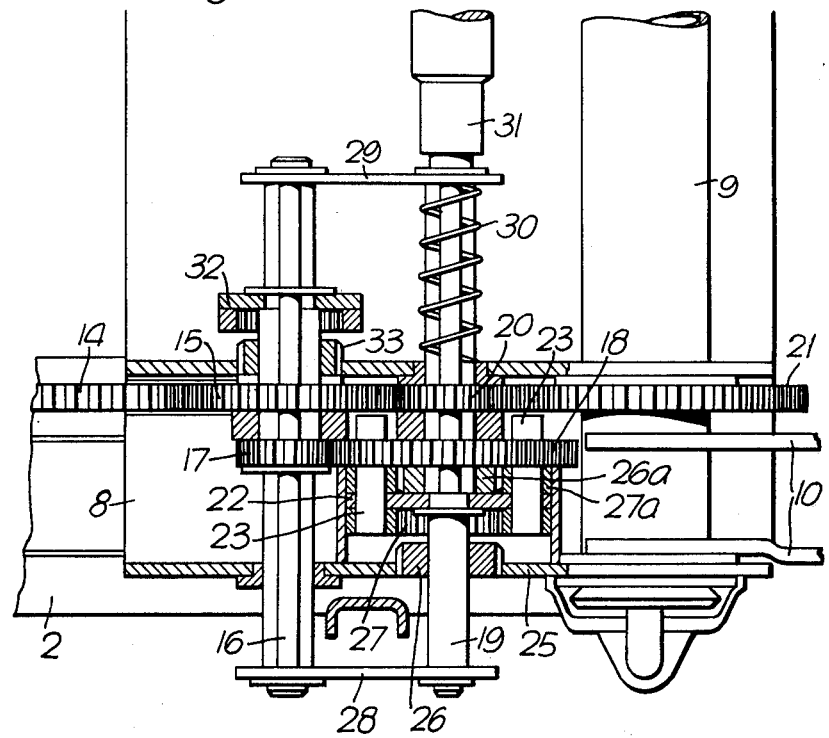
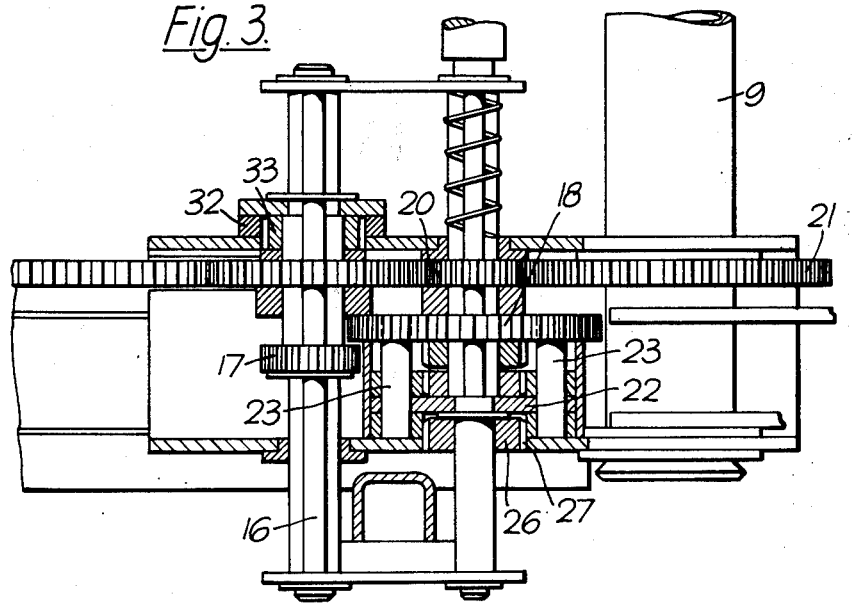

VEHICLE SEAT

BACKGROUND OF THE INVENTION

The present invention relates to a vehicle seat which is adjustable in the longitudinal direction in guideways and the inclination of which is adjustable by an additional adjusting device.

The guideways of present-day vehicle seats are often arranged such as to ascend towards the front. As persons with shorter legs generally are also short-bodied, by means of the automatic upward adjustment of the seat during the forward movement, it may be achieved that even small persons will be seated high enough in order to have a sufficient view and to be able to easily follow the traffic situation.

The forward positioning of the seat is a must for small-sized persons in order to reduce the distance between the front edge of the seat and the operating pedals in accordance with the shorter length of the lower leg. If the vehicle seat is automatically lifted when being moved forwards, this, however, will counteract the desired distance reduction.

SUMMARY OF THE INVENTION

The present invention is based on the object of providing a vehicle seat which will ensure a sufficient reduction of the distance between the vehicle's pedals and the front edge even if the seat is moved forwards on a plane which is ascending towards the front.

A feature of the present invention is the provision of a vehicle seat which is adjustable in the longitudinal direction by a first adjustment device including guideways and the inclination of which is adjustable by a second adjustment device comprising: a train of toothed gears for automatically coupling together the first and second adjustment devices.

By means of this inventive design it is achieved that the vehicle seat will be more inclined forwards the more it is moved forwards. Small-sized persons, therefore, will be lifted sufficiently in order to achieve a suitable position for driving, yet will still be able to reach the vehicle's pedals with their feet thanks to the lowered front edge of the seat.

An advantageous embodiment of the invention owes its advantages to the arrangement of an adjusting lug which supports two shafts and an adjusting shaft which effects the inclination adjustment and to the fact that the two shafts are cooperating with each other by means of gears, one gear always being in mesh with a rack of the guideway.

This embodiment has the advantage of being very sturdy and of enabling the easy addition of a motor drive for automatic seat adjustment.

Measures are provided to allow a fine adjustment for individual adapting of the seat inclination, besides the automatic inclination adjustment brought about during the longitudinal adjustment of the vehicle seat, without any alteration of the basic relationship between the longitudinal and inclination adjustments.

BRIEF DESCRIPTION OF THE DRAWING

Above-mentioned and other features and objects of this invention will become more apparent by reference to the following description taken in conjunction with the accompanying drawing, in which:

FIG. 1 shows a side view of the vehicle seat in accordance with the principles of the present invention;

FIG. 2 shows a top view of a detail of the vehicle seat in accordance with principles of the present invention, a slight difference existing with regard to FIG. 1 as far as a motor drive is concerned;

FIG. 3 shows the arrangement according to FIG. 2 in another position of the components that are essential for the seat adjustment.

DESCRIPTION OF THE PREFERRED EMBODIMENT

Figure 4:
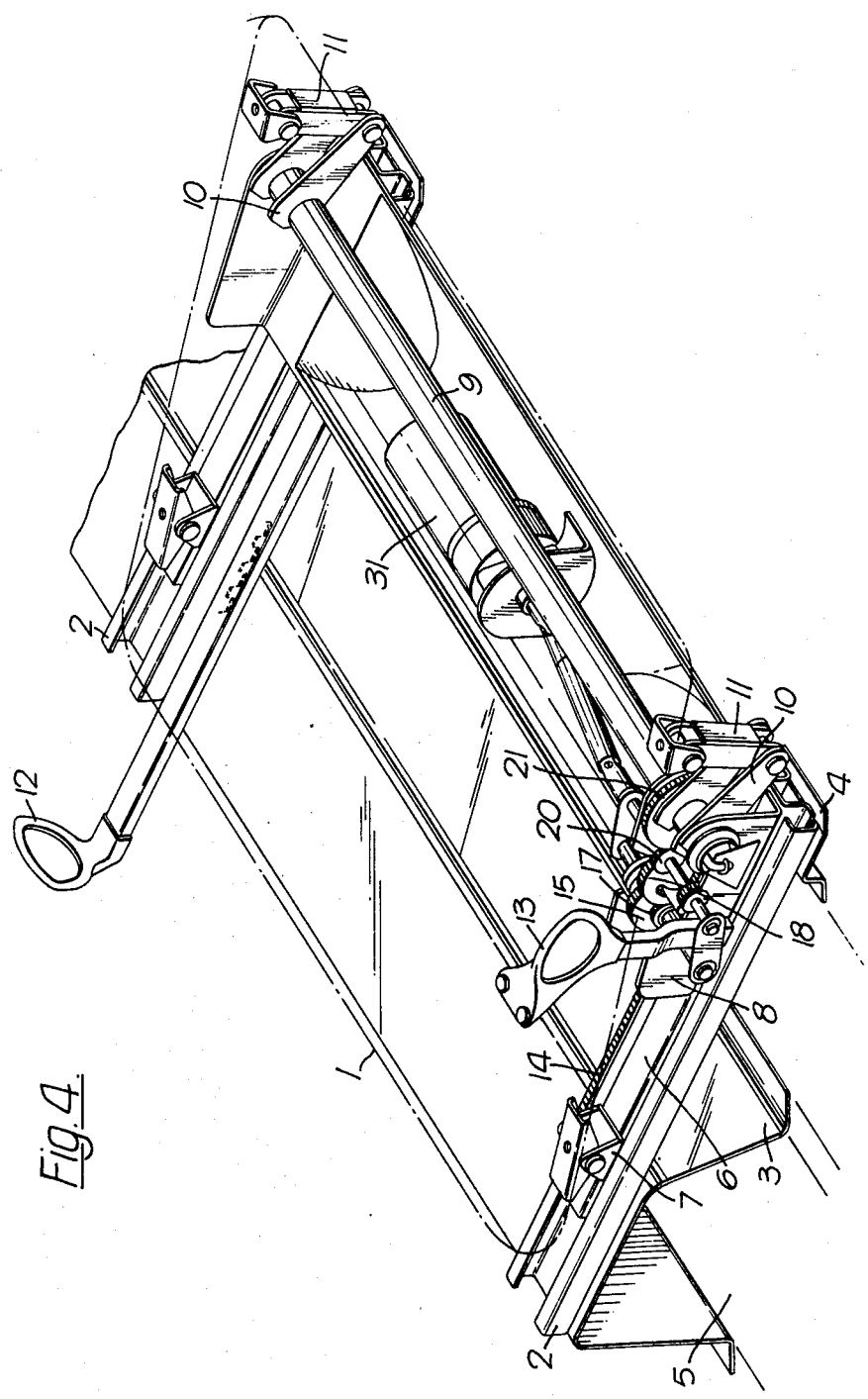
FIG. 4 shows a perspective view of the vehicle seat in accordance with the principles of the present invention.

FIGS. 1 and 4 show the lower part of a seat 1 which is displaceable in the longitudinal direction in guideways 2. Guideways 2 are arranged on consoles 3 and 4 of a vehicle bottom 5 such as to ascend towards the front. Two guideways 2 each are arranged in the usual manner for each vehicle seat. In each of guideways 2 there is provided a slide 6 which is rigidly connected with a supporting lug 7 and an adjusting lug 8. The lower part of the seat 1 is tiltably supported at the supporting lug 7. The adjusting lug 8 supports an adjusting shaft 9 which on both sides of the seat has an arm 10 to which a lever 11 is fastened in a tiltable manner which, on its part, is hinged to the vehicle seat 1.

FIGS. 1 and 4 further show a handle 12 at the front side of the lower part of the seat 1. By lifting handle 12 a tooth lock 35 (see FIG. 1) is disengaged so that the slide 6 will become displaceable within the guideway 2 by means of which the longitudinal adjustment is made possible. In FIGS. 1 and 4, further, a hand lever 13 is to be discerned. If it is pulled the adjusting shaft 9 will be able to twist within the predetermined limits which will lead to a tilting of the lower part of the seat 1 around the supporting lug 7, since the lower part of the seat 1 will be lifted or lowered by means of the lever 11.

As for the rest, the entire arrangement is designed such that a forward displacement of the lower part of the seat 1 will automatically lead to a counter-clockwise tilting of the lower part of the seat 1. In order to describe the means required to this end reference is now made to FIG. 2.

On the guideway 2, a rack 14 is rigidly arranged. Rack 14 is engaged by a pinion 15 which drives a shaft 16 of the adjusting lug 8. The shaft 16 is provided with a further gear 17 which, in the position illustrated in FIG. 2, engages a gear 18 of a second shaft 19. Like the shaft 16, the shaft 19 is provided with another gear 20 which is continually in mesh with a gear 21 of the adjusting shaft 9. Further, on the shaft 19, a disk 22 is arranged which supports a pair of internally toothed profile rings 27 and 27a such as to secure them against twisting and which itself, in relation to the shaft 9, is positively secured against twisting by means of an externally toothed profile ring 26a. The disk 22 and the pair of internally toothed profile rings 27 and 27a carry two pins 23 which engage two elongated holes 24 of the gear 18, said holes being shaped like circular arcs and illustrated by dotted lines in FIG. 1.

On a side wall 25 of the adjusting lug 8, an externally toothed profile ring 26 is arranged which can be engaged by the profile ring 27 of the disk 22 as the shaft 19 is displaced.

It is also important for the operation of the entire arrangement that the two shafts 16 and 19 are connected with each other by means of brackets 28, 29 and that they are jointly axially displaceable by means of the lever 13 in conjunction with a spring 30 arranged on the shaft 19.

FIG. 2 shows a detail by means of which the arrangement differs from that of FIG. 1. While, according to FIG. 1, the longitudinal adjustment of the vehicle seat is brought about by means of a force supplied by the driver, after the actuation of the handle 12, in the assembly according to FIG. 2 an electric motor 31 serves the longitudinal adjustment. To this end, the shaft 19 is driven by the electric motor 31. In order to be able to lock the longitudinal adjustment an internally toothed profile ring 32 is disposed on the shaft 16 such as to be untwistable with regard to the shaft 16. A corresponding externally toothed profile ring 33 is located outside at the adjusting lug 8.

As regards the operation of the inventive arrangement it is necessary that the profile ring 32 and the gear 17 be disposed such as to be axially undisplaceable on the shaft 16. However, the pinion 15 is not rigidly fixed with regard to the shaft 16 so that, upon an axial displacement of the shaft 16, the pinion 15 will always remain in its position illustrated in FIG. 2. The gears 18 and 20 are likewise not axially fixed on the shaft 19 and will remain in their positions depicted in FIG. 2 when the shaft 19 will be axially moved.

Now, the mode of operation of the longitudinal adjustment of the vehicle seat will be described, FIG. 2 serving as reference. After the actuation of an electric switch 36 illustrated in FIG. 1, the electric motor 31 will drive the shaft 19. The gears 20 and 18 will jointly rotate with the shaft 19. Further, the disk 22 will be rotating, thus an unhindered rotation of the gear 18 being possible. The gear 18 will drive the gear 17 and hence the shaft 16. The shaft 16 served for driving the pinion 15 which is in mesh with the rack 14. Thereby the entire assembly will move on the guideway 2 either forwards or backwards, according to the sense of rotation of the electric motor 31. As the gear 20 is in mesh with the gear 21, the adjusting shaft 9 will automatically rotate during the longitudinal movement of the lower part of the seat 1. Thereby the inclination of the vehicle seat is automatically changed as the longitudinal movement of the vehicle seat takes place.

In order to effect an inclination adjustment within predetermined limits and independently of the longitudinal adjustment the hand lever 13 (FIG. 1) must be actuated. Thereby the bracket 28 is displaced, together with the shafts 16 and 19, into the position shown in FIG. 3. The profile ring 32 will then be in engagement with the profile ring 33 which is stationarily connected to the housing. Thus the shaft 16 will be prevented from rotating. In consequence thereof the longitudinal adjustment is locked. Due to the displacement of the shaft 16 the gear 17 has been disengaged from gear 18.

As a result of the displacement of the shaft 19 the profile rings 26 and 27 are in mesh with each other. Thereby the disk 22 is secured against twisting. In this way the pins 23 are likewise stationarily fixed. Thereby the gear 18 will only be able to twist in correspondence with the length of the elongated holes 24 shown in FIG. 1. As already explained, the rotation of the gear 18 will lead to a rotation of the gear 20, by means of which the adjusting shaft 9 is driven via the gear 21, hence the inclination adjustment is brought about.

While we have described above the principles of our invention in connection with specific apparatus it is to be clearly understood that this description is made only by way of example and not as a limitation to the scope of our invention as set forth in the objects thereof and in the accompanying claims.

We claim:

1. A vehicle seat which is adjustable in the longitudinal direction by a first adjustment device including two spaced guideways and the inclination of which is adjustable by a second adjustment device comprising:

a train of toothed gears for automatically coupling together said first and second adjustment devices; and an adjusting lug associated with one of said two spaced guideways supporting two shafts 16 and 19 and an adjusting shaft 9 which effects the inclination adjustment, said two shafts 16 and 19 and said adjusting shaft 9 cooperate with each other by means of a plurality of gears, one of said plurality of gears being in mesh with a rack 14 of said one of said two spaced guideways;

said two shafts including a first shaft 16 having a first gear 15 and a second gear 17 and a second shaft 19 having a third gear 18 and a fourth gear 20, said second shaft 19 being axially displaceable with respect to said third gear 18 and said fourth gear 20 and said first shaft 16 being displaceable with respect to said first gear 15 which is in mesh with said rack 14, said second gear 17 being carried along;

said fourth gear 20 being in mesh with a gear 21 of said adjusting shaft 9, while said third gear 18 in the initial position is in mesh with said second gear 17 which is axially fixed to said first shaft 16;

a disk carried by said second shaft 19 having a projection thereon to engage on elongated hole is said third gear 18; and a locking device to secure said disk from twisting upon axial displacement of said first shaft 16 and said second shaft 19.

2. A vehicle seat according to claim 1, wherein said locking device includes
   a first profile ring rigidly fastened to a side wall of said adjusting lug, and
   a corresponding second profile ring of said disk.

3. A vehicle seat according to claim 2, further including
   a third profile ring on said second shaft 19 by means of which said disk is connected with said second shaft 19 in the initial position to secure said disk against twisting.

* * * * *